Figure 2:
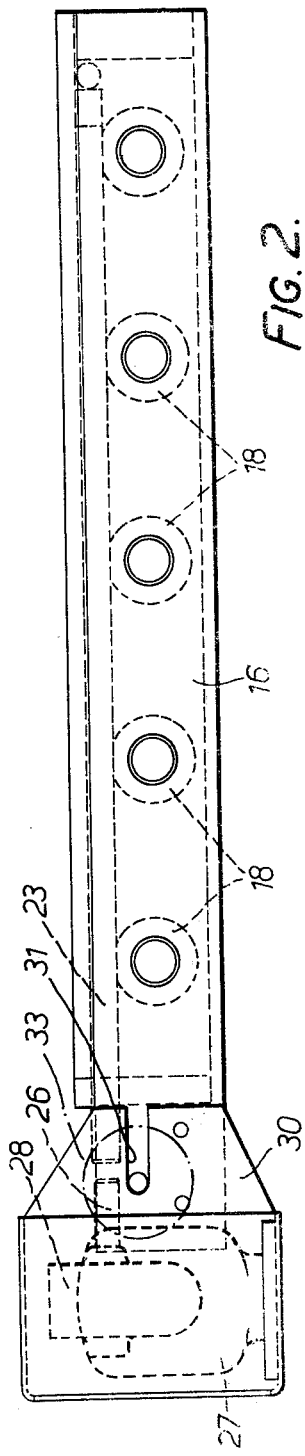

United States Patent [19]
Wightman

[11] 3,945,538
[45] Mar. 23, 1976

[54] APPARATUS FOR DISPENSING VISCOUS MATERIAL

[75] Inventor: John Clifford Wightman, Swansea, Wales

[73] Assignee: D. Ayres Jones & Company Limited, Swansea, Wales

[22] Filed: Dec. 20, 1974

[21] Appl. No.: 534,924

[30] Foreign Application Priority Data
Dec. 22, 1973 United Kingdom............... 59681/73

[52] U.S. Cl.................................. 222/333; 118/14
[51] Int. Cl.² ........................................... B67D 5/44
[58] Field of Search .......... 222/333, 63; 118/24, 25, 118/14; 239/225

[56] References Cited
UNITED STATES PATENTS
| | | | |
|---|---|---|---|
| 1,618,471 | 2/1927 | Piccardo | 118/14 |
| 2,614,472 | 10/1952 | Luboshez | 239/225 X |
| 3,014,624 | 12/1961 | Shimatani et al. | 222/333 |
| 3,642,206 | 2/1972 | Waldrum | 239/225 X |
| 3,724,720 | 4/1973 | Bullivant | 222/63 X |

Primary Examiner—Robert B. Reeves
Assistant Examiner—John B. Shannon
Attorney, Agent, or Firm—Pollock, Vande Sande & Priddy

[57] ABSTRACT

The invention relates to apparatus for delivering viscous or pasty food materials such as batter or sugar confectionery, and especially for producing complex decorative shapes. The apparatus comprises a fitting connected to a pump and formed with a row of discharge nozzles, each with a non-symmetrical orifice, and an independent variable speed motor for rotating the nozzles simultaneously while the material is discharged. The nozzles are readily removable for cleaning.

1 Claim, 5 Drawing Figures

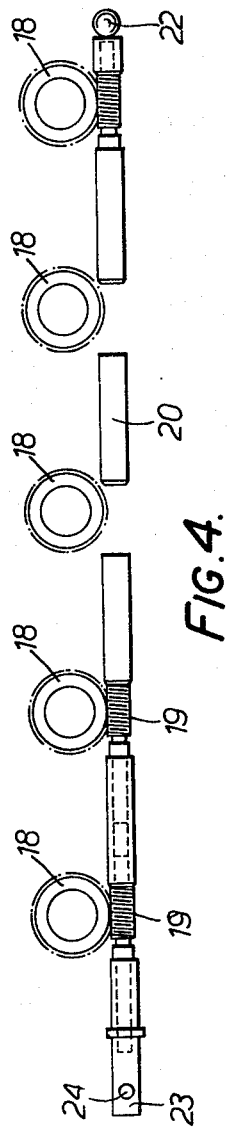
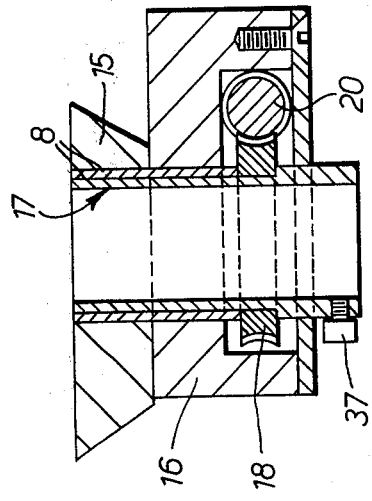
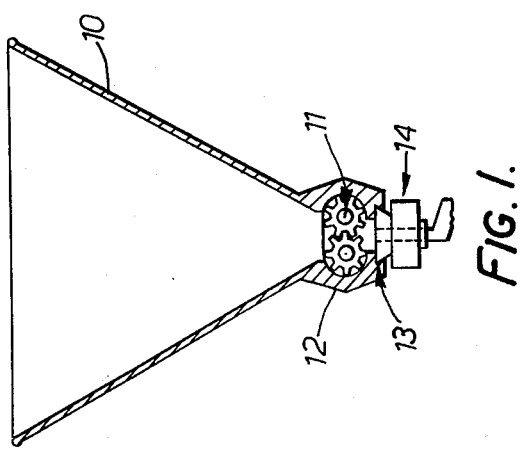

U.S. Patent  March 23, 1976  Sheet 2 of 2  3,945,538

APPARATUS FOR DISPENSING VISCOUS MATERIAL

This invention relates to apparatus for delivering or dispensing viscous, pasty, or other semi-solid materials, and is particularly though not exclusively applicable to apparatus for use in delivering materials as used by bakers, confectioners or pastry makers such as dough, batter, whipped white of egg, or sugar or cream confections, e.g., in the making of small cakes, pies, pastries, meringues, etc., In present day bakery trade operations there is a need to deliver a variety of different materials in large numbers of individual portions onto baking trays for subsequent processing. It is common practice to dispense the material by means of a pump and a discharge nozzle onto a baking tray below, the rate of discharge being controlled and also the movement of the tray to control the quantity and to some extent the shape of the individual portions of material discharged onto the tray. Existing nozzle dispensers however have only limited facility for producing different shapes and it is an object of the present invention accordingly to provide an improved dispensing apparatus which will have an improved capacity in this respect.

Broadly stated the invention consists in apparatus for use in delivering a viscous, pasty, or semi-solid material, such as bakers', confectioners ' or pastry makers' material, comprising means for supporting a discharge nozzle for rotation about an axis, the nozzle orifice being non-symmetrical about the axis, and drive means for imparting continuous rotary movement to the nozzle.

The apparatus preferably comprises a plurality of such nozzles supported for rotation on parallel spaced axes, and arranged to be driven from a common input drive element. The drive means conveniently includes a worm drive shaft extending transversely to the axis of the or each nozzle, and a co-operating gear coupled to the or each nozzle. The drive means in any case preferably includes a variable speed control and may incorporate a separate electric motor solely for use in driving the discharge nozzle.

According to another preferred feature of the invention the or each nozzle is readily removable from the apparatus for cleaning purposes. The motor, when provided, is also preferably detachable readily from the remainder of the apparatus to facilitate cleaning.

The invention is particularly applicable to an apparatus of the type defined, constructed and arranged as a self-contained unit for attachment to a dispensing machine. Alternatively however the apparatus may be built into a dispensing machine as an integral component thereof.

Figure 3:
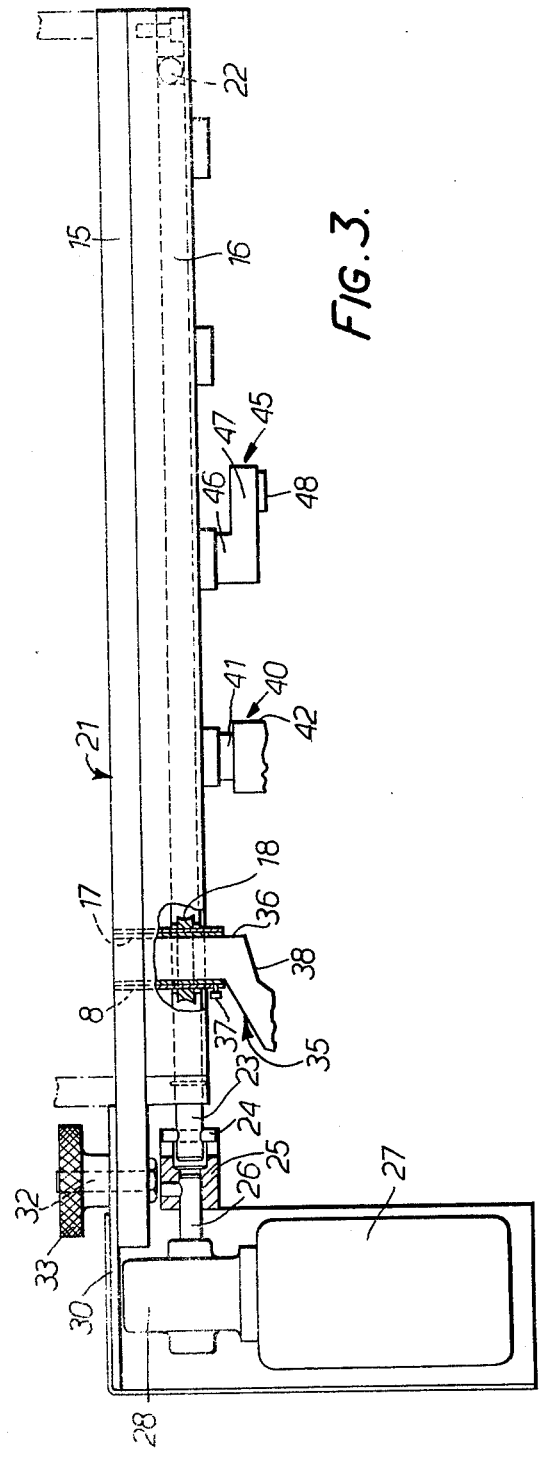

The invention may be performed in various ways and one specific embodiment will now be described by way of example with reference to the accompanying drawings, in which:

FIG. 1 is a side elevation of a hopper and gear pump dispensing unit with a rotary discharge nozzle according to the present invention fitted thereto, FIG. 2 is a plan view of the discharge nozzle unit, FIG. 3 is a side elevation partly in section of the discharge nozzle unit, FIG. 4 is a diagrammatic exploded view of the worm drive mechanism, and FIG. 5 is a sectional elevation on an enlarged scale through the vertical axis of one of the discharge nozzles.

The apparatus illustrated in FIG. 1 forms part of a complete bakery trade dispensing machine for example of the type described in U.S. Pat. No. 3,782,428. For the purposes of the present invention it is sufficient to state that the machine includes a hopper 10 with an upper opening into which the batter or other material is introduced, and a gear pump 11 located at the lower delivery from the hopper, the pump being driven by the main drive for the machine. The gear casing 12 is provided with an elongated slot 13 in its under-surface, with undercut flanks, to receive and locate the rotary discharge nozzle unit 14 as described in more detail below with reference to FIGS. 2 to 5.

This unit 14 comprises an upper mounting bar or template 15 having corresponding inclined flank surfaces to fit within the undercut slot 13, and a lower gear casing 16 securely attached thereto. The parts 15 and 16 are provided with a plurality (in this case five) of spaced vertical apertures receiving vertical rotary guide tubes 17 within bearing sleeves 8. Each guide tube is mounted for rotation in its bearing sleeve and supported vertically by thrust washers or the equivalent. The upper end of each guide tube 17 is flush with the upper face 21 of the template 15 for a purpose to be described and its lower end projects downwardly below the under-surface of the casing 16 and is formed with an internal socket to receive a discharge nozzle as will be described below.

Each tube is secured to a surrounding annular gear 18 and these five gears 18 mesh with corresponding worm drive sections 19 on a worm shaft 20 extending longitudinally within the casing 16. The worm drive shaft 20 is located within the casing 16 by bearings and at its right hand end as illustrated in FIGS. 3 and 4 it is located by a ball bearing 22 positioned on the axis. The opposite end of the shaft which projects from the casing at 23 is provided with a short transverse pin 24 which provides part of a detachable torsional connection with a slotted clevis coupling sleeve 25 connected to a drive shaft 26. The drive shaft 26 is driven by a small variable speed electric motor 27, preferably a D.C. shunt wound motor, with an electronic variable speed control. The motor shaft is connected to the shaft 26 through a reducing gear box 28. The drive unit, including the motor 27, gear box 28 and variable speed control, is provided as a separate unit detachable from the unit 15, 16. For this purpose the motor casing is formed with a horizontal top flange 30 having a slot 31 to receive a vertical stud 32 attached to the adjacent end of the template 15. A tightening screw 33 on the stud 32 acts as a quick release means for clamping the parts 30 and 13 rigidly together. This coupling also provides means for maintaining the connection between the worm drive shaft 20 and the gear shaft 26, which is likewise readily detachable.

The actual rotary discharge nozzles may take various different forms but advantageously they are of a type in which the discharge nozzle aperture is non-symmetrical about the vertical axis of the nozzle so that as the nozzle rotates it generates the required shape which may be annular, spiral, cycloidal, or otherwise, depending upon the relative speed of rotation of the nozzle the linear speed of movement of the baking tray onto which the material is being dispensed, and the speed of the gear pump 11.

Referring to FIG. 3, the left hand nozzle indicated generally at 35 comprises a cylindrical upper portion 36 designed to fit into the lower end of the guide tube 17 and to be connected thereto by a quick release device such as a simple screw thread 37 in the lower end of the sleeve, or a spring detent, or friction fit. The lower part of the nozzle includes an inclined lateral discharge section 38 and an off-set discharge aperture 39 with a serrated edge. Thus it will be seen that as the nozzle rotates, with or without simultaneous linear movement of the baking tray below, the shape of the dispensed material will produce a decorative annular ring structure or a spiral or cycloidal type of profile.

In another form of discharge nozzle as illustrated at 40 in FIG. 3, there is again an upper cylindrical portion 41 designed to fit into the lower end of the guide tube 17 and a lower discharge portion 42 with a serrated lower edge. Although this nozzle has a concentric circular aperture as seen in section, the serrations are not symmetrical and the flow of the material over the serrations will be downwards and outwards at an incline and the result will be a form of spiral or fluted cone. The further discharge nozzle illustrated at 45 also includes an upper cylindrical section 46 to fit in the lower end of the guide tube 17, and a lateral tube portion 47 having a circular vertical discharge opening 48. On rotation of the nozzle this will generate an annular shape which may be varied to cycloidal depending upon the speed of movement of the batter tray below.

For cleaning purposes it is extremely simple to remove the whole unit from the pump gear casing 12 by sliding the template 15 out of the inclined slot 13. The motor unit can then be detached by releasing the clamping screw 33. The top surface 21 can then be wiped clean, after which all the rotary nozzles can be removed from the guide tubes 17. It is then only necessary to wash the individual nozzles themselves.

It will be noted that this apparatus as described is capable of providing continuous rotation of all the individual rotary nozzles. This is of great advantage by comparison with any system which can only rotate the nozzles through limited angular movement. In lieu of the worm drive described and illustrated, other drive systems may be used. For example the individual nozzle guide tubes may be coupled together by providing annular surrounding drive gears which mesh directly one with each other, the end gear being driven from an external drive gear. Alternatively the rotary nozzles may be driven by a continuous looped chain drive or friction or toothed belt drive, and instead of using an electric motor as illustrated, the drive to the rotary nozzles may be provided by a flexible transmission drive coupling designed to be attached to a power take-off on the main machine itself.

All exposed parts of the apparatus are preferably formed of stainless steel, synthetic plastics, or other non-corrosive readily cleaned material.

I claim:

1. A nozzle device for use with apparatus for dispensing pasty food products comprising a hopper and a motor driven pump, including an elongated mounting member adapted to be removably connected to a part of said hopper, a plurality of tubular nozzle drive elements mounted for rotation on spaced parallel vertical axes in said mounting member each nozzle drive element having an open upper end to communicate with the outlet from said pump, and an open lower end formed to act as a nozzle socket, a plurality of nozzles respectively removably located in the said nozzle socket of a corresponding one of said nozzle drive elements, each nozzle having a nozzle orifice which is non-symmetrical about the axis of rotation of said nozzle, a variable speed nozzle drive motor, independent of the motor driving said pump, and drive means connecting said drive motor to each of said nozzle drive elements, to cause simultaneous synchronous rotation of said nozzles.

* * * * *